United States Patent
Ishii et al.

(10) Patent No.: US 11,029,959 B2
(45) Date of Patent: Jun. 8, 2021

(54) BRANCH TARGET LOOK UP SUPPRESSION

(71) Applicant: Arm Limited, Cambridge (GB)

(72) Inventors: Yasuo Ishii, Austin, TX (US); Muhammad Umar Farooq, Austin, TX (US); Chris Abernathy, Austin, TX (US)

(73) Assignee: Arm Limited, Cambridge (GB)

( * ) Notice: Subject to any disclaimer, the term of this patent is extended or adjusted under 35 U.S.C. 154(b) by 125 days.

(21) Appl. No.: 16/120,674

(22) Filed: Sep. 4, 2018

(65) Prior Publication Data

US 2020/0073666 A1 Mar. 5, 2020

(51) Int. Cl.
*G06F 9/38* (2018.01)

(52) U.S. Cl.
CPC .......... *G06F 9/3806* (2013.01); *G06F 9/3851* (2013.01)

(58) Field of Classification Search
CPC .... G06F 9/3806; G06F 9/3851; G06F 9/3848; G06F 9/3844; G06F 9/3836
See application file for complete search history.

(56) References Cited

U.S. PATENT DOCUMENTS

| | | | |
|---|---|---|---|
| 5,764,946 A * | 6/1998 | Tran | G06F 9/3844 711/118 |
| 10,402,200 B2 * | 9/2019 | Dundas | G06F 9/3806 |
| 10,445,102 B1 * | 10/2019 | Pistol | G06F 9/3832 |
| 2015/0121050 A1 * | 4/2015 | Williams | G06F 9/3848 712/238 |
| 2016/0110202 A1 * | 4/2016 | Filippo | G06F 9/3844 712/240 |

* cited by examiner

*Primary Examiner* — Aimee Li
*Assistant Examiner* — Kasim Alli
(74) *Attorney, Agent, or Firm* — Nixon & Vanderhye P.C.

(57) ABSTRACT

Branch prediction circuitry processes blocks of instructions and provides instruction fetch circuitry with indications of predicted next blocks of instructions to be retrieved from memory. Main branch target storage stores branch target predictions for branch instructions in the blocks of instructions. Secondary branch target storage caches the branch target predictions from the main branch target storage. Look-ups in the secondary branch target storage and the main branch target storage are performed in parallel. The main branch target storage is set-associative and an entry in the main branch target storage comprises multiple ways, wherein each way of the multiple ways stores a branch target prediction for one branch instruction. The branch prediction circuitry stores a way prediction for which of the multiple ways contain the branch target predictions for a predicted next block of instructions and stores a flag associated with the way prediction indicating whether all branch target predictions stored for the predicted next block of instructions in the main branch target storage are also stored in the secondary branch target storage. An active value of the flag suppresses the look-up in the main branch target storage for the predicted next block of instructions.

18 Claims, 6 Drawing Sheets

BRANCH TARGET LOOK UP SUPPRESSION

TECHNICAL FIELD

The present disclosure relates to data processing. In particular, the present disclosure relates to a data processing apparatus in which branch target prediction is carried out.

DESCRIPTION

A data processing apparatus which executes instructions which comprise branch instructions may be provided with the capability to predict whether the branches defined by those branch instructions will be taken and the target address to which the branch leads when it is taken. Accordingly, a branch target buffer (BTB) may be provided to store predictions for the targets of the branches within a set of instructions currently being executed. On the one hand, such a BTB may be relatively large in order to be able to predict targets for many different branch instructions, but this large capacity also has consequence that the BTB requires a non-negligible amount of time in order to make its predictions. A BTB may be formed as a set-associative cache, wherein each way of the cache can hold information relating to one branch. To reduce the prediction latency of the BTB, the data processing apparatus may additionally be provided with a smaller, faster branch target storage (sometimes referred to as a micro BTB) to cache branch target information from the main BTB. Although this smaller BTB does not have the storage capacity of the main BTB, its faster response time enables improved performance because of its lower response latency.

SUMMARY

In one example embodiment described herein there is an apparatus comprising: instruction fetch circuitry to fetch a block of instructions from memory; branch prediction circuitry to process the block of instructions and provide the instruction fetch circuitry with an indication of a predicted next block of instructions to be retrieved from memory, the branch prediction circuitry comprising: main branch target storage to store branch target predictions for branch instructions in the block of instructions; and secondary branch target storage to cache the branch target predictions from the main branch target storage, wherein the branch prediction circuitry is capable of initiating a look-up in the secondary branch target storage in parallel with a look-up in the main branch target storage, wherein the main branch target storage is set-associative and an entry in the main branch target storage corresponding to the block of instructions comprises multiple ways, wherein each way of the multiple ways is capable of storing a branch target prediction for one branch instruction in the block of instructions; and wherein the branch prediction circuitry is arranged to store a way prediction for which of the multiple ways contain the branch target predictions for the predicted next block of instructions and to store a flag associated with the way prediction indicating whether all branch target predictions stored for the predicted next block of instructions in the main branch target storage are also stored in the secondary branch target storage, and wherein the branch prediction circuitry is responsive to an active value of the flag to suppress the look-up in the main branch target storage for the predicted next block of instructions.

In one example embodiment described herein there is a method of operating a data processing apparatus, the method comprising the steps of: fetching a block of instructions from memory; performing branch prediction, comprising processing the block of instructions and providing an indication of a predicted next block of instructions to be fetched from memory, the performing branch prediction comprising the steps of: storing in main branch target storage branch target predictions for branch instructions in the block of instructions; caching in secondary branch target storage branch target predictions from the main branch target storage; initiating a look-up in the secondary branch target storage in parallel with a look-up in the main branch target storage, wherein the main branch target storage is set-associative and an entry in the main branch target storage corresponding to the block of instructions comprises multiple ways, wherein each way of the multiple ways is capable of storing a branch target prediction for one branch instruction in the block of instructions; storing a way prediction indicating which of the multiple ways contain branch target predictions for the predicted next block of instructions; storing a flag associated with the way prediction indicating whether all branch target predictions stored for the predicted next block of instructions in the main branch target storage are also stored in the secondary branch target storage; and suppressing the look-up in the main branch target storage for the predicted next block of instructions in response to an active value of the flag.

In one example embodiment described herein there is an apparatus comprising: means for fetching a block of instructions from memory; means for performing branch prediction, wherein the means for performing branch prediction is arranged to process the block of instructions and to provide an indication of a predicted next block of instructions to be fetched from memory, the means for performing branch prediction comprising: main branch target storage means for storing branch target predictions for branch instructions in the block of instructions; secondary branch target storage means for caching branch target predictions from the main branch target storage means; means for initiating a look-up in the secondary branch target storage means in parallel with a look-up in the main branch target storage means, wherein the main branch target storage means is set-associative and an entry in the main branch target storage means corresponding to the block of instructions comprises multiple ways, wherein each way of the multiple ways is capable of storing a branch target prediction for one branch instruction in the block of instructions; means for storing a way prediction indicating which of the multiple ways contain branch target predictions for the predicted next block of instructions; means for storing a flag associated with the way prediction indicating whether all branch target predictions stored for the predicted next block of instructions in the main branch target storage means are also stored in the secondary branch target storage means; and means for suppressing the look-up in the main branch target storage means for the predicted next block of instructions in response to an active value of the flag.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
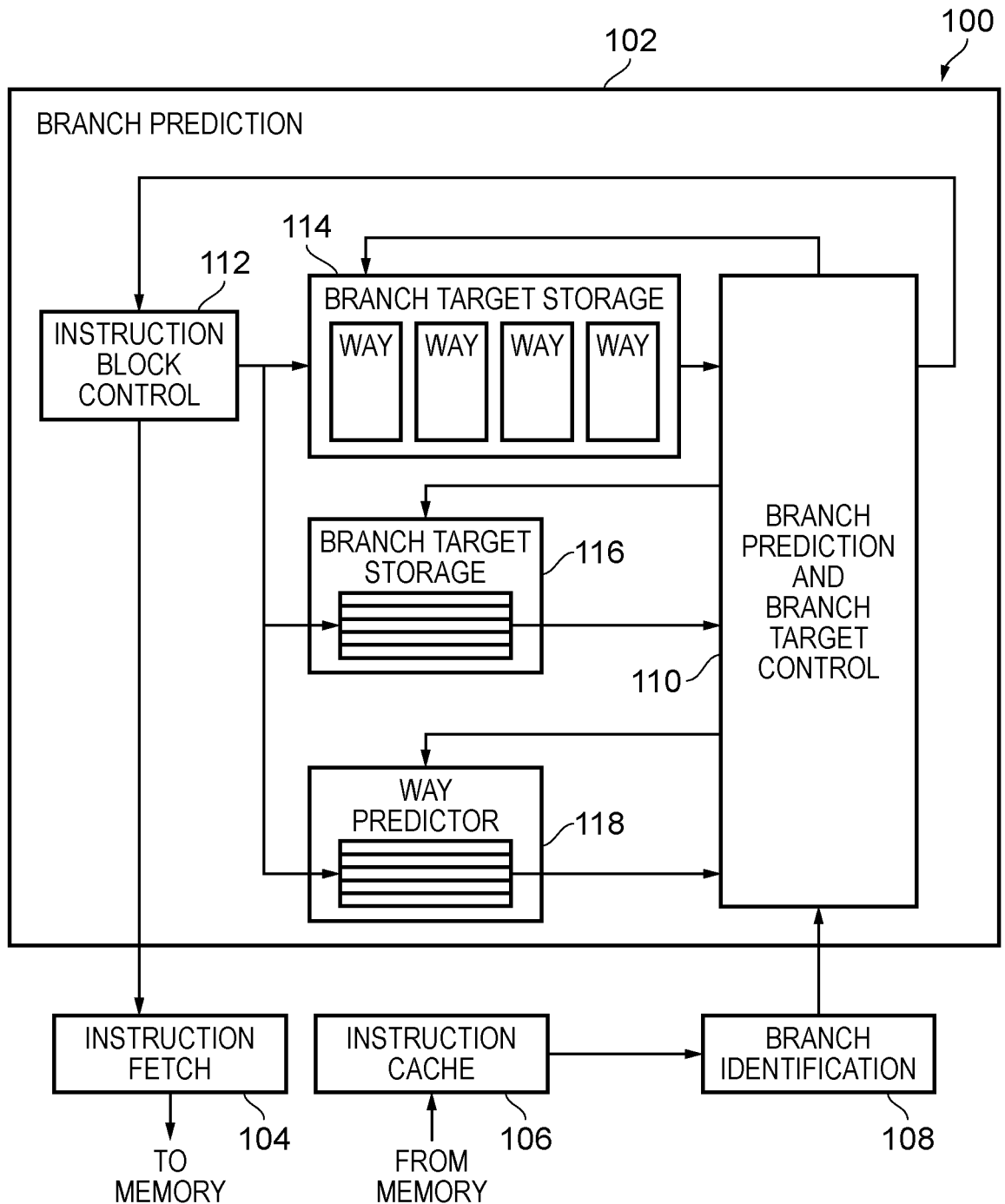
FIG. 1 schematically illustrates branch prediction circuitry in a data processing apparatus in one embodiment.

Before discussing the embodiments with reference to the accompanying figures, the following description of embodiments is provided.

In accordance with one example configuration there is provided an apparatus comprising instruction fetch circuitry to fetch a block of instructions from memory; branch prediction circuitry to process the block of instructions and provide the instruction fetch circuitry with an indication of a predicted next block of instructions to be retrieved from memory, the branch prediction circuitry comprising: main branch target storage to store branch target predictions for branch instructions in the block of instructions; and secondary branch target storage to cache the branch target predictions from the main branch target storage, wherein the branch prediction circuitry is capable of initiating a look-up in the secondary branch target storage in parallel with a look-up in the main branch target storage, wherein the main branch target storage is set-associative and an entry in the main branch target storage corresponding to the block of instructions comprises multiple ways, wherein each way of the multiple ways is capable of storing a branch target prediction for one branch instruction in the block of instructions; and wherein the branch prediction circuitry is arranged to store a way prediction for which of the multiple ways contain the branch target predictions for the predicted next block of instructions and to store a flag associated with the way prediction indicating whether all branch target predictions stored for the predicted next block of instructions in the main branch target storage are also stored in the secondary branch target storage, and wherein the branch prediction circuitry is responsive to an active value of the flag to suppress the look-up in the main branch target storage for the predicted next block of instructions.

The branch prediction circuitry of the apparatus enables the apparatus to more reliably pre-fetch blocks of instructions from memory, even when those blocks of instructions comprise branch instructions, by predicting what the next block of instructions to be retrieved should be. The provision of both a main branch target storage to store branch target predictions and a secondary branch target storage to cache branch target predictions from the main branch target storage enables the branch prediction circuitry to benefit from both the storage capacity of the main branch target storage (i.e. to store a usefully large number of branch target predictions) whilst also benefiting from the lower latency of the secondary branch target storage. Accordingly as a combined mechanism for holding branch target predictions this can provide both a large storage capacity and a fast response time. Nevertheless this then comes at the price of increased power consumption if operating both of these branch target storage components in parallel. In this context the provision of the capability to store way predictions for which of the multiple ways of the set-associative main branch target storage contain branch target predictions for the predicted next block of instructions, together with a flag which indicates whether all branch target predictions stored in the main branch target storage for the predicted next block of instructions are also stored in the secondary branch target storage, enables the branch prediction circuitry to respond to this information by suppressing the lookup in the main branch target storage, when it is known that (by means of the flag being set) the information required is available in the secondary branch target storage alone. The power consumption of the branch prediction circuitry may therefore be reduced.

The way prediction and the flag associated with the way prediction may be variously stored according to the present techniques. In some embodiments the apparatus comprises way prediction storage and the branch prediction circuitry is arranged to store the way prediction and the flag in an entry of the way prediction storage associated with the block of instructions when the predicted next block of instructions sequentially follows the block of instructions. Thus dedicated way prediction storage is provided and the way prediction and the flag are stored in an entry of this way prediction storage. Such embodiments are arranged to store the way prediction of the flag in this manner when the predicted next block of instructions sequentially follows the block of instructions, i.e. the branch prediction circuitry determines that the block of instructions does not comprise any branch instructions which are predicted to be taken and therefore the predicted next block of instructions is that which sequentially follows the block of instructions.

In some embodiments the branch prediction circuitry is arranged to store the way prediction and the flag in association with a branch target prediction cached in the secondary branch target storage when the predicted next block of instructions begins with a target instruction of the branch target prediction and a source branch instruction of the branch target prediction in the block of instructions is predicted to be taken. Accordingly, this information (the way prediction and the flag) may be stored in association with an entry in the secondary branch target storage, i.e. a branch target prediction cached therein. This is of relevance in the context of a situation in which the predicted next block of instructions begins with a target instruction of the branch target prediction, i.e. the branch prediction circuitry has determined that there is a branch instruction in the (current) block of instructions which is predicted to be taken and the secondary branch target storage thus comprises an entry indicating what the target of that branch instruction is predicted to be. The way prediction and flag can therefore be stored in association with this information.

Whilst generally the flag associated with the way prediction may indicate whether all branch target predictions stored for the predicted next block of instructions in the main branch target storage are also stored in the secondary branch target storage, in some embodiments the branch prediction circuitry is arranged to determine a flag setting condition to be true when the main branch target storage has at most one branch target prediction for one branch instruction in the block of instructions and the at most one branch target prediction is cached in the secondary branch target storage, and the branch prediction circuitry is responsive to the flag setting condition being true to set the active value of the flag in the way prediction. Thus in such embodiments an additional constraint is imposed that the main branch target storage has at most one branch target prediction for one branch instruction in the block of instructions. Applying this additional constraint simplifies the configuration of the apparatus without losing coverage.

In some embodiments a storage capacity of the secondary branch target storage is less than a storage capacity of the main branch target storage. Generally in the selection of a storage device a trade off is to be made between the capacity of the storage device and its response latency, i.e. the greater the storage capacity the longer the device will take to return its content. Accordingly, as mentioned above, a useful balance may therefore be achieved when providing both a main branch target storage and a second branch target storage when the secondary branch target storage is smaller than the main branch target storage, since the apparatus can benefit from the typically shorter response time of the smaller secondary branch target storage.

The secondary branch target storage may take a variety of forms, but in some embodiments each entry in the secondary branch target storage comprises a single branch target prediction for the block of instructions. This enables a compact storage device with a faster lookup response time to be provided.

In addition to the suppression of the lookup in the main branch target storage for the predicted next block of instructions when the flag has its active value, in some embodiments the branch prediction circuitry is responsive to the way prediction indicating that none of the multiple ways contains branch target predictions for the predicted next block of instructions to suppress the look-up in the main branch target storage for the predicted next block of instructions. This therefore represents an additional mechanism by which power may be conserved when it is known that the main branch target storage contains no branch target predictions for the predicted next block of instructions.

The way prediction can additionally support a granular approach to look up suppression in the main branch target storage by allowing suppression of those ways which are predicted as not containing branch predictions for the predicted next block of instructions. Accordingly, in some embodiments the branch prediction circuitry is responsive to the way prediction to suppress activation of ways indicated by the way prediction as not containing branch target predictions for the predicted next block of instructions when the predicted next block of instructions is processed by the branch prediction circuitry.

In some embodiments the branch prediction circuitry comprises branch outcome prediction circuitry to generate a prediction of whether each of the branch instructions in the block of instructions will be taken or not-taken, and wherein the predicted next block of instructions to be processed: begins at the branch target prediction for a first branch instruction in the block of instructions predicted to be taken by the branch outcome prediction circuitry; and begins at a next sequential instruction after the block of instructions, when the branch target prediction does not predict any taken branch instructions in the block of instructions.

The way prediction and the flag may be handled in a variety of ways, but in some embodiments the apparatus comprises way prediction storage and the branch prediction circuitry is arranged to store the way prediction and the flag in an entry of the way prediction storage associated with the block of instructions when the predicted next block of instructions sequentially follows the block of instructions, wherein the branch prediction circuitry comprises multiple pipelined stages and the branch prediction circuitry is arranged to read out entries in parallel from the secondary branch target storage and the way prediction storage at a first stage of the multiple pipelined stages, and the branch prediction circuitry is responsive to the prediction generated by the branch outcome prediction circuitry to select between the entries read out in parallel from the secondary branch target storage and the way prediction storage. Thus when the predicted next block of instructions sequentially follows the block of instructions, i.e. the branch prediction circuitry predicts that there are no taken branch instructions in the block of instructions, then the way prediction and the flag are stored in association with the block of instructions in the way prediction storage. The multiple pipelined stages of the branch prediction circuitry support the administration of this process, since the relationship between sequential blocks of instructions in the pipeline can be determined and responded to.

In some embodiments the branch prediction circuitry comprises multiple pipelined stages, wherein the multiple pipelined stages comprise at least two pipelined stages following the branch outcome prediction circuitry, wherein the at least two pipelined stages comprises a first stage following the branch outcome prediction circuitry and a second stage following the first stage, and wherein each pipelined stage holds information relating to a single block of instructions.

In some embodiments the branch prediction circuitry comprises update circuitry responsive to an indication that an earlier block of instructions in the second stage is terminated by the first branch instruction in the block of instructions predicted to be taken by the branch outcome prediction circuitry and that the secondary branch target storage comprises an entry for the first branch instruction in the block of instructions predicted to be taken, to cause the entry to be updated to comprise the way prediction and the flag for a later block of instructions in the first stage. The first branch of instruction in the block of instructions which is predicted to be taken represents the point at which it is expected that program flow will depart from the block of instructions and thus an entry for this first branch instruction can usefully be annotated with the way prediction and flag information corresponding to the predicted target of that branch instruction.

In some embodiments the update circuitry is responsive to an indication that the earlier block of instructions in the second stage comprises at most a single branch target prediction for a single branch instruction in the earlier block of instructions and the single branch target prediction is cached in the secondary branch target storage, to store the set value of the flag in the way prediction entry for the earlier block of instructions in the way prediction storage. Accordingly when the earlier block of instructions is encountered again by the branch prediction circuitry the set value of the flag indicates that only a single branch target prediction for the block is stored in the main branch target storage and is also cached in the secondary branch target storage. Look up in the main branch target storage for the predicted next block of instructions can therefore be suppressed in the expectation that this single branch target prediction information can be retrieved from the secondary branch target storage alone, without reference to the main branch target storage.

In some embodiments the apparatus comprises way prediction storage and the branch prediction circuitry is arranged to store the way prediction and the flag in an entry of the way prediction storage associated with the block of instructions when the predicted next block of instructions sequentially follows the block of instructions, wherein the branch prediction circuitry comprises update circuitry responsive to an indication that an earlier block of instructions in the second stage comprises no predicted taken branch instructions to cause the entry for the earlier block of instructions in the second stage to be created in the way prediction storage to store the way prediction and the flag for the earlier block of instructions. Accordingly, when for example the earlier block of instructions is encountered for the first time by the branch prediction circuitry, a corresponding entry in the way prediction storage can be created when it is determined that the earlier block of instructions comprises no predicted taken branch instructions.

In some embodiments the branch prediction circuitry comprises update circuitry responsive to replacement of an entry in the secondary branch target storage for the later block of instructions in the first stage to invalidate a way prediction corresponding to the earlier block of instructions in the second stage. The replacement of an entry in the secondary branch target storage may break the condition under which the entry in the second branch target storage was made, namely that all branched target predictions stored for the predicted next block of instructions in the main branch target storage were also stored in the second branch target storage, and therefore invalidation of the way prediction prevents a false prediction being made.

In some embodiments the update circuitry is responsive to the replacement of the entry in the secondary branch target storage for the later block of instructions in the first stage to invalidate all flags in the secondary branch target storage. Thus in such embodiments a more complete approach to the invalidation may be taken by invalidating all flags in the secondary branch target storage. This simplifies the approach to the invalidation since a procedure for identifying the appropriate entry in the secondary branch target storage to invalidate is not required.

In some embodiments the apparatus comprises way prediction storage and the branch prediction circuitry is arranged to store the way prediction and the flag in an entry of the way prediction storage associated with the block of instructions when the predicted next block of instructions sequentially follows the block of instructions, wherein the update circuitry is responsive to the replacement of the entry in the secondary branch target storage for the later block of instructions in the first stage to invalidate all flags in the way prediction storage. Similarly this approach of invalidating all flags in the way prediction storage simplifies the approach to the invalidation by avoiding requiring a mechanism for identifying a corresponding entry in the way prediction storage.

In some embodiments the branch prediction circuitry comprises update circuitry responsive to storage of a new branch target prediction in the main branch target storage for the block of instructions to invalidate the way prediction corresponding to a source address for the new branch target prediction. The storage of a new branch target prediction in the main branch target storage may mean that the condition under which a way prediction was generated may no longer hold and accordingly it is appropriate to invalidate a corresponding source address for this new branch target prediction.

In accordance with one example configuration there is provided a method of operating a data processing apparatus, the method comprising the steps of: fetching a block of instructions from memory; performing branch prediction, comprising processing the block of instructions and providing an indication of a predicted next block of instructions to be fetched from memory, the performing branch prediction comprising the steps of: storing in main branch target storage branch target predictions for branch instructions in the block of instructions; caching in secondary branch target storage branch target predictions from the main branch target storage; initiating a look-up in the secondary branch target storage in parallel with a look-up in the main branch target storage, wherein the main branch target storage is set-associative and an entry in the main branch target storage corresponding to the block of instructions comprises multiple ways, wherein each way of the multiple ways is capable of storing a branch target prediction for one branch instruction in the block of instructions; storing a way prediction indicating which of the multiple ways contain branch target predictions for the predicted next block of instructions; storing a flag associated with the way prediction indicating whether all branch target predictions stored for the predicted next block of instructions in the main branch target storage are also stored in the secondary branch target storage; and suppressing the look-up in the main branch target storage for the predicted next block of instructions in response to an active value of the flag.

In accordance with one example configuration there is provided an apparatus comprising: means for fetching a block of instructions from memory; means for performing branch prediction, wherein the means for performing branch prediction is arranged to process the block of instructions and to provide an indication of a predicted next block of instructions to be fetched from memory, the means for performing branch prediction comprising: main branch target storage means for storing branch target predictions for branch instructions in the block of instructions; secondary branch target storage means for caching branch target predictions from the main branch target storage means; means for initiating a look-up in the secondary branch target storage means in parallel with a look-up in the main branch target storage means, wherein the main branch target storage means is set-associative and an entry in the main branch target storage means corresponding to the block of instructions comprises multiple ways, wherein each way of the multiple ways is capable of storing a branch target prediction for one branch instruction in the block of instructions; means for storing a way prediction indicating which of the multiple ways contain branch target predictions for the predicted next block of instructions; means for storing a flag associated with the way prediction indicating whether all branch target predictions stored for the predicted next block of instructions in the main branch target storage means are also stored in the secondary branch target storage means; and means for suppressing the look-up in the main branch target storage means for the predicted next block of instructions in response to an active value of the flag.

Particular embodiments will now be described with reference to the figures.

FIG. 1 illustrates apparatus 100 in accordance with one example embodiment. The apparatus comprises branch prediction circuitry 102, instruction fetch circuitry 104, instruction cache 106, and branch identification circuitry 108. The instruction fetch circuitry 104 causes blocks of instructions (e.g. eight sequential instructions) to be retrieved from memory (not illustrated) in order to populate the instruction cache 106, such that instruction execution circuitry (not shown) can efficiently operate by directly retrieving required instructions from the instruction cache 106 rather than needing to incur the latency associated with retrieval of instructions from the memory. Where the instructions comprise branch instructions the branch prediction circuitry 102 and the branch identification circuitry 108 are provided to identify branch instructions retrieved from memory within the blocks of instructions retrieved and to predict the next block of instructions on the basis of previously observed behaviour. It will be understood therefore that when a retrieved block of instructions contains no branch instructions then it may be reliably predicted that the next block of instructions required will sequentially follow. However, when a retrieved block of instructions comprises at least one branch instruction, and that branch instruction is predicted to be taken, then the next block of instructions required will begin at the target instruction of the branch instruction predicted to be taken.

Branch prediction circuitry 102 comprises branch prediction and branch target control 110 which has overall control of the branch prediction circuitry 102 and its components. In particular it directs the instruction block control 112 such that it correctly signals to the instruction fetch circuitry 104 to cause the predicted next block of instructions to be retrieved into the instruction cache 106. Branch prediction circuitry 102 is shown to further comprise branch target storage 114, branch target storage 116 and way predictor storage 118. Although both store branch target information, branch target storage 114 and branch target storage 116 have different configurations, namely that branch target storage 114 is set-associative and the four ways of this set-associative storage component are illustrated. By contrast branch target storage 116 has smaller capacity, is not set-associative, and is arranged to cache branch target predictions retrieved from the branch target storage 114. The way predictor 118 is made use of, as will be described in more detail with reference to the figures which follow, in order to predict which of the ways of the branch target storage 114 hold a valid branch target prediction for a given instruction source address. More detail of the branch prediction circuitry 102 will be given with reference to the figures which follow, but the general scheme of operation is the following. For a block of instructions retrieved and stored in the instruction cache 106 the branch identification circuitry 108 identifies branch instructions within that block and notifies these to the branch prediction and branch target control circuitry 110. The branch prediction and branch target control circuitry 110 controls the use of the branch target storage 114, the branch target storage 116, and the way predictor 118 and in dependence on the information provided by those components generates a prediction of the next block of instructions which will be required. This prediction is signalled to the block control 112 which controls the inputs to the branch target storage 114, branch target storage 116, and way predictor 118 and also signals to the instruction fetch circuitry 104 which block of instructions should be fetched next. A block of instructions retrieved from memory in response to the operation of the instruction fetch circuitry 104 is then stored in the instruction cache 106. This circular process continues and when the branch prediction circuitry 102 is able to accurately predict the next blocks of instructions required, this results in the instruction cache 106 already being populated with blocks of instructions required for execution and the operation of the wider apparatus is not slowed down by waiting for retrieval of instructions from memory. In addition, the caching of entries from the branch target storage 114 in the branch target storage 116 enables this process to be carried out more efficiently since the look up latency in the smaller branch target storage 116 is less than that of the larger branch target storage 114. Also the content of a corresponding entry in the way predictor 118 enables the branch prediction and branch target control 110 to signal to the branch target storage 114 to indicate which ways of the branch target storage should be activated for a next lookup process, thus enabling one or more ways of the branch target storage 114 not to be activated for some lookups, saving power. Finally, and as will be described in more detail with reference to the figures which follow, the way prediction information further comprises a flag which the branch prediction and branch target control 110 causes to be set when it is identified that for a corresponding block of instructions it is predicted that the branch target storage only holds one branch target prediction in one of its ways and further that that branch prediction is also cached in the branch target storage 116. When this is the case (i.e. the flag is set) the entire lookup in the branch target storage 114 is suppressed and only the branch target storage 116 is accessed in order to retrieve this branch target prediction. This provides a further power saving.

Figure 2A:
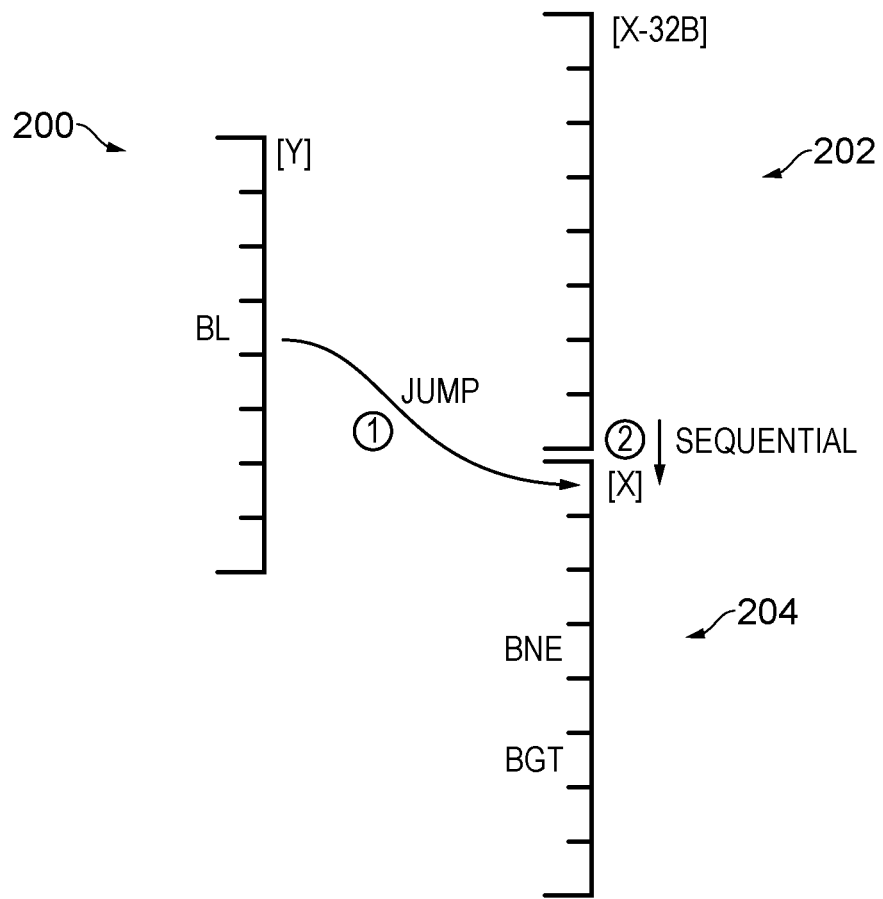
FIG. 2A illustrates two routes via which a block of instructions may be reached, either by a jump in program flow due to a taken branch in another block of instructions, or sequentially following a block of instructions in which no branches are taken.

FIG. 2A illustrates three blocks of instructions 200, 202, and 204, where each block comprises eight sequential instructions. The address of the first instruction in each block is labelled as [Y] (for block 200), [X−32B] (for block 202), and [X] (for block 204). FIG. 2A also shows two routes via which the address [X] beginning the block of instructions 204 may be reached. The first is as a jump (discontinuous instruction flow) when the branch instruction BL in the block of instructions 200 is taken. The second is when the block of instructions 202 (which contains no branch instructions) is executed and thus the block of instructions 204 sequentially follows the block of instructions 202. This recognition of the two routes by which the block of instructions 204 beginning with the instruction at [X] may be reached is of significance within the context of the present discussion since way prediction information (including the flag) is stored in association with source instruction information and it is therefore necessary in connection with a way prediction for the block of instructions 204 to identify the two blocks of instructions 200 and 202 which may lead to the block of instructions 204. Finally note that the block of instructions 204 comprises two branch instructions BNE and BGT and the branch target predictions for these branch instructions may be stored in the branch target storage (114 and 116) as part of the above described branch prediction mechanisms.

Figure 2B:
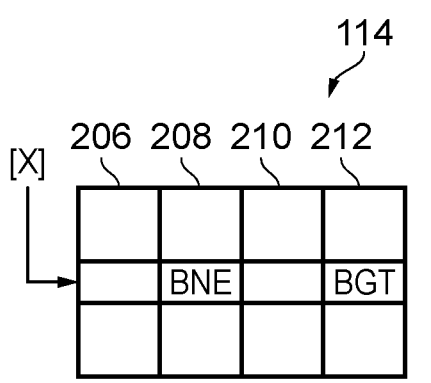
FIGS. 2B and 2C illustrates branch target buffer information for one of the blocks of instructions shown in FIG. 2A with corresponding way prediction information and a flag in accordance with one example embodiment.
Figure 2B:
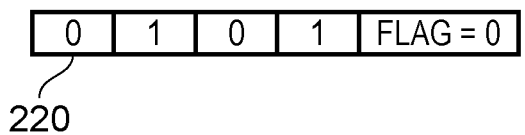
Figure 2C:
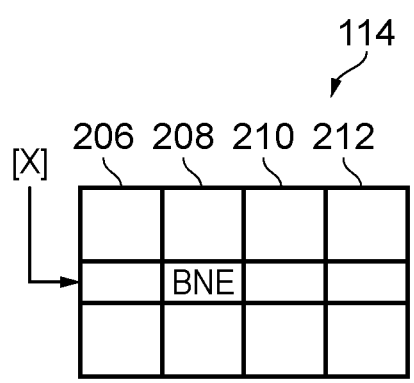

FIGS. 2B and 2C schematically illustrate branch target storage 114 and a look up on the basis of instruction address [X] (i.e. the start of the block of instructions 204 shown in FIG. 2A). In the example of FIG. 2B the corresponding set of entries in the branch target storage 114 has no branch target prediction in way 206, has a branch target prediction for the instruction BNE in the way 208, has no branch target prediction in the way 210, and has a branch target prediction for the branch instruction BGT in the way 212. Hence, when a look up in the branch target storage 114 on the basis of the instruction address [X] is made, two branch target predictions can be returned. Then on the basis of a prediction of whether either of these branch instructions BNE and BGT in block 204 will be taken the branch target prediction can select the appropriate branch target address. By comparison in FIG. 2C an example is given in which the look up in the branch target storage 114 on the basis of the instruction as address [X] yields only a branch target prediction for the BNE instruction in way 208. FIG. 2B and FIG. 2C additionally show corresponding way prediction and flag information 220 and 222 for the set of entries respectively identified in FIGS. 2B and 2C in the branch target storage on the basis of the instruction address [X]. Thus in FIG. 2B the way prediction and flag information indicates the presence of a branch target prediction in two out of four of the ways of the branch target storage, whilst in the example of FIG. 2C the way prediction and flag information 222 indicates the presence of a branch target prediction in only one of the ways of the branch target storage. Note further that the flag value is not set (i.e. is zero) in 220 whilst it is set (i.e. is one) in 222. A set value of the flag indicates that all branch target predictions for this entry in the set-associate branch target storage 114 are also stored in the caching branch target storage 116. This is not the case in the example of FIG. 2B (since only one branch target prediction per entry can be stored in branch target storage 116), whereas in the case of FIG. 2C the flag value is set, indicating that the branch target prediction for the BNE instruction is cached in the branch target storage 116. As will be explained in more detail with reference to the figures which follow, on the basis of this set flag the lookup in the branch target storage 114 is suppressed and only the output from the branch target storage 116 is relied upon to provide the required branch target prediction.

Figure 3A:
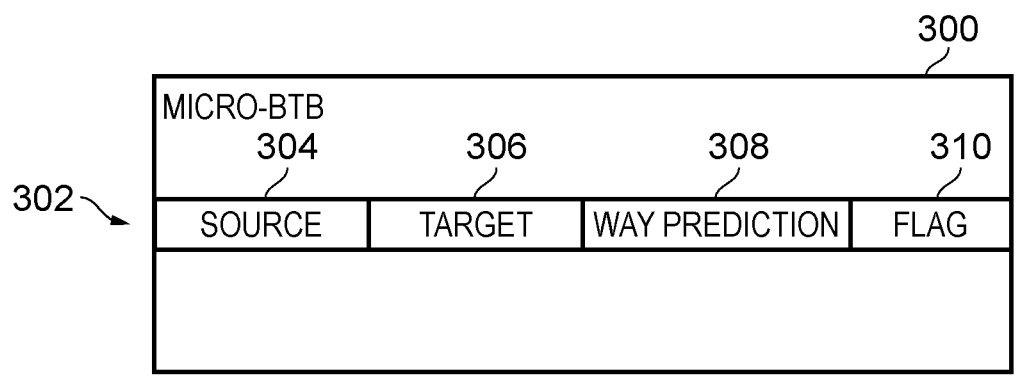
FIG. 3A illustrates an example entry in a micro BTB in one example embodiment.

The way prediction and flag information may be stored in two different locations in the branch prediction circuitry, namely in the branch target storage 226 in association with an entry therein or within the way predictor 118. This is schematically illustrated in FIG. 3A where the micro BTB 300 comprises a number of entries, one of which 302 is illustrated comprising a source address 304, a target address 306, way prediction information 308, and a flag value 310. Thus, when a look up in this micro BTB 300 is performed on the basis of a source address (at which a branch instruction is predicted to be taken) the predicted target address 306 can be retrieved as well as the way prediction information 308 and flag value 310.

Figure 3B:
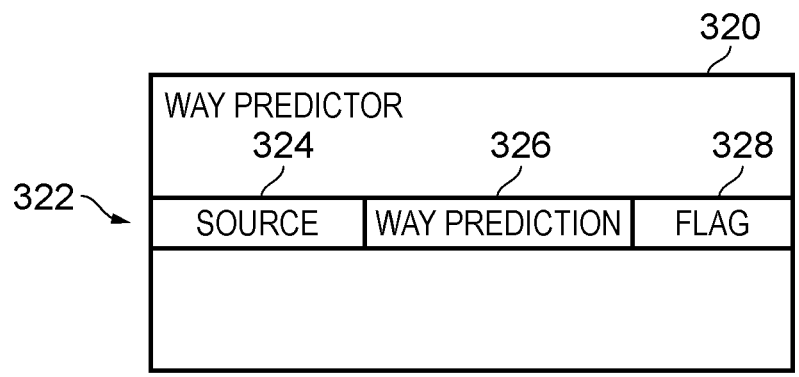
FIG. 3B illustrates an entry in a way predictor in one example embodiment.

FIG. 3B schematically illustrates a way predictor 320 of which an entry 322 is shown comprising a source address 324, a way prediction 326 and a flag value 328. Thus a look up in this way predictor is performed on the basis of a source address and when a match is found with a source address 324 the way prediction information 326 and flag value 328 are read out.

Figure 3C:
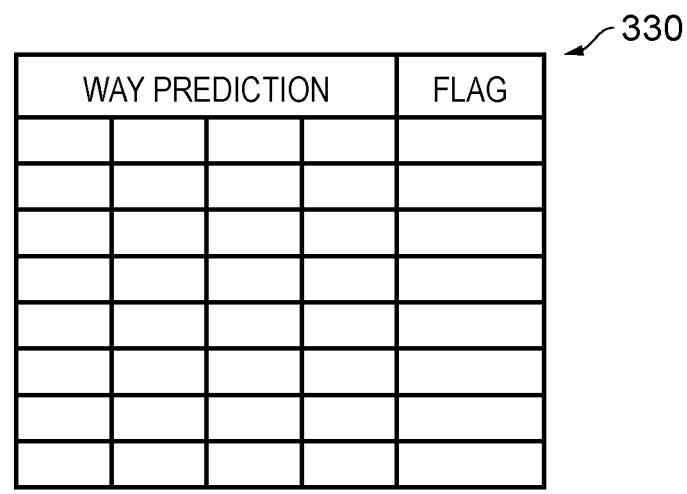
FIG. 3C illustrates sets of way prediction and flag information in one example embodiment.

Finally FIG. 3C indicates one configuration of the way prediction information and flag information 330 wherein the way prediction of information is provided as a set of values corresponding to the ways of the main branch target storage and these are stored in association with a flag value.

Figure 4:
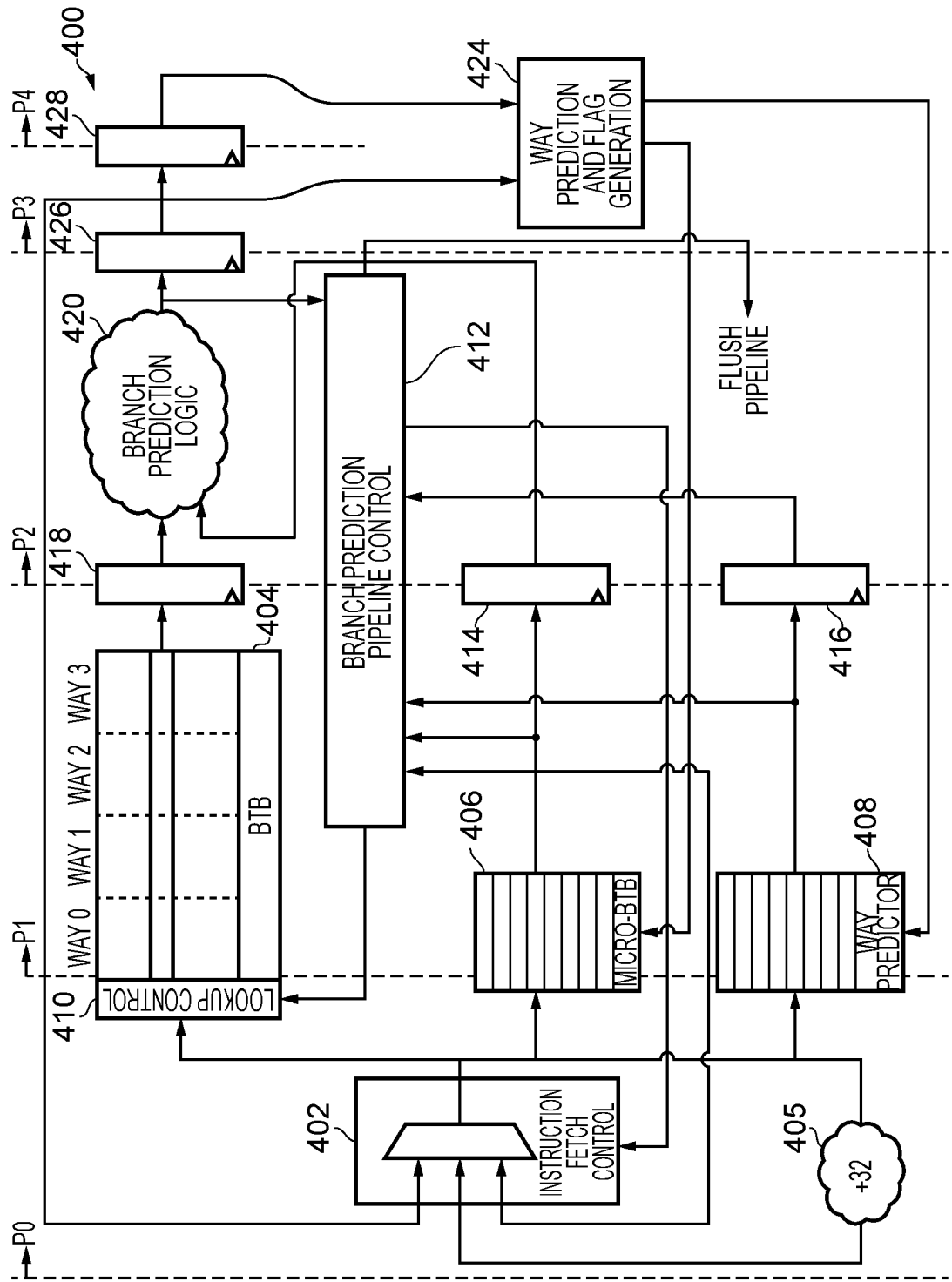
FIG. 4 schematically illustrates branch prediction circuitry in one example embodiment.

FIG. 4 schematically illustrates branch prediction circuitry 400 according to one example embodiment. Instruction fetch control 402 determines the block of instructions which is communicated to the instruction fetch mechanism to be retrieved from memory. The circuitry 400 comprises a mechanism 405 by means of which this block of instructions (identified by the first instruction address within that block) may be incremented by 32B (i.e. in this example of 32-bit instructions in steps of 8 instructions) at each iteration. In the absence of any branch instructions this is the manner in which sequential blocks of instructions are fetched. However the instruction fetch control 402 also receives input from the remainder of the branch prediction circuitry which can override the 32B increments and cause the block of instructions to be retrieved from another address (the target of a predicted taken branch instruction). The current address (the first address in the current block of instructions under consideration) is provided as an input to the main branch target storage (BTB) 404, to the micro BTB 406 and to the way predictor 408. A look up in the BTB 404 is performed under the control of the look up control circuitry 410 which receives a control input from the branch prediction pipeline control 412. This input can cause the look up to be performed either in all ways of the identified set of entries, only in a sub-set of those ways, or can cause the look up to be suppressed entirely. A look up in the micro BTB 406 identifies a given entry and (see FIG. 3A) if the current address matches the source address in that entry then the target address may be made use of if this branch is predicted as taken. Corresponding way prediction information and a flag value are also read out from the entry when a hit occurs in the micro BTB 406. This information is supplied to the branch prediction pipeline control 412 and is temporarily held in the pipeline stage 414 before being forwarded to the branch prediction logic 420. At the same time as the look up in the micro BTB 406 a look up is performed in the way predictor 408 (see FIG. 3B) and when a hit occurs the corresponding entry is read out and the way prediction information and flag are supplied to the branch prediction pipeline control 412 and are temporarily stored in the pipeline stage 416 before being accessed by the branch prediction control 412. If a look up in the main BTB 404 occurs (i.e. is not fully suppressed) then the output of the look up is temporarily stored in the pipeline stage 418. A branch target prediction either read out from the main BTB 404 or read out from the micro BTB 406 is passed to branch prediction logic 420 which, on the basis of the address of the branch instructions, predicts whether this branch will be taken or not. This is performed on the basis of observed behaviour of the apparatus with respect to previously executed instructions. This particular aspect of the apparatus operates in a manner with which one of ordinary skill in the art will be familiar and merely for the sake of brevity is not described in detail here. The prediction generated by the branch prediction logic 420 is provided to the branch prediction pipeline control 412. As indicated by the path from the output of micro BTB 406 to the instruction fetch control 402, a hit in the micro BTB 406 also causes the target address of the hit entry to be passed to the instruction fetch control 402 as an input. Similarly, output from the BTB 404 (from pipeline stage 426) is fed back as an input to the instruction fetch control 402. When a hit occurs in either the BTB 404 or the micro BTB 406 and the branch prediction logic 420 predicts that the branch will be taken, the branch prediction pipeline control 412 causes the instruction fetch control 402 to use the respective branch target instead of the incremented (+32B) input. Note that the branch prediction pipeline control 412 has a "flush pipeline" output to cause the pipelined branch prediction stages to be flushed when a hit occurs in either the BTB 404 or the micro BTB 406 and the branch prediction logic 420 predicts that the branch will be taken, since this discontinuity in instruction flow will mean that sequentially fetched instruction blocks already in the pipeline which follow the instruction block which contains the predicted taken branch instruction will not be made use of. Nominal pipeline "stages" (P0, P1, P2, P3, and P4) are also labelled in FIG. 4, reference to which may be made in combination with the description below of FIG. 5 with respect to the progress of blocks of instructions through this set of pipelined branch prediction stages.

The branch prediction circuitry further comprises way prediction and flag generation circuitry 424. This receives inputs from the pipelined stages 426 and 428 such that information relating to a block of instructions (in stage 426)

may be compared with the block of instructions which preceded it (in stage 428). Accordingly, for example referring to FIG. 2A in the event of a branch instruction being taken, then the pipeline stage 326 could comprise the block of instructions beginning with instruction at address [X], whilst pipeline stage 428 could comprise the block of instructions beginning at address [Y]. Alternatively in the event of no branch instruction being taken (or no branch instructions being present at all) then the pipeline stage 428 could instead comprise the block of instructions beginning with the address [X−32B]. On the basis of a comparison of the content of the two pipeline stages and the associated branch prediction information generated by branch prediction logic 420 (i.e. whether any of the branch instructions within a given block are predicted to be taken) then the way prediction and flag generation circuitry 424 can either cause an update to be made to the corresponding entry of the micro BTB 406 (for a taken branch prediction), or an update to an entry in the way predictor 408 for a not-taken prediction (or absence of branch instruction). Rather than updating an entry, if an entry does not exist then one may be made in either of the cache-like structures 406 and 408. Further, depending on whether a branch is predicted to be taken or not taken, the way prediction and flag information read out (if present) from micro BTB 406 (for taken) or way predictor 408 (for not-taken) is used by the branch prediction pipeline control 412 to control the corresponding subsequent look up in the BTB 404 (signalled to the look up control 410 of the BTB 404), such that when the flag is set the look up is entirely suppressed and when the flag is not set if at least one way is marked no look up in that way is performed.

The way prediction and flag generation circuitry 424 also signals to the micro BTB 406 or the way predictor 408 when updates are needed to content therein on the basis of whether there is a branch in the block of instructions at stage 428 which is predicted to be taken or not-taken. Such an update is carried out by control circuitry of the micro BTB 406 or the way predictor 408 (not explicitly shown), which may therefore be considered to be an example of update circuitry for the branch prediction circuitry (possibly in combination with the way prediction and flag generation circuitry 424, depending on the respective roles each plays in the update). For example, for a predicted taken branch and when the micro BTB 406 has an entry for the corresponding (source) branch instruction the entry can be updated to comprise the way prediction and the flag for the block of instructions which are the corresponding target. When there is just one branch target prediction for the block that has been found in the BTB 404 and that single branch target prediction is cached in the micro BTB 406, the update circuitry can cause the set value of the flag to be stored in a corresponding micro BTB 406 or way prediction storage 408 entry. When a corresponding entry in the micro BTB 406 or way prediction storage 408 yet exists, the update circuitry responsive causes such an entry to be allocated. Updating of the way prediction and flag information stored in the micro BTB 406 or way prediction storage 408 can also occur when other changes are made in the branch prediction circuitry. For example, the replacement of an entry in the micro BTB 406 for a target block of instructions can be responded to by causing invalidation of a way prediction corresponding to the source block of instructions. As a more comprehensive response, the update circuitry can respond to the replacement of such an entry in the micro BTB 406 for the target block of instructions to invalidate all flags in the micro BTB 406. This has been found to simplify the interaction with the micro BTB 406 without significantly negatively affecting performance. Similarly the update circuitry can respond to the replacement of the entry in the micro BTB 406 for the target block of instructions to invalidate all flags in the way prediction storage 408. This has been found to simplify the interaction with the way prediction storage 408 without significantly negatively affecting performance. The update circuitry can also respond to storage of a new branch target prediction in the BTB 404 for a block of instructions to invalidate a way prediction corresponding to a source address for the new branch target prediction.

Figure 5:
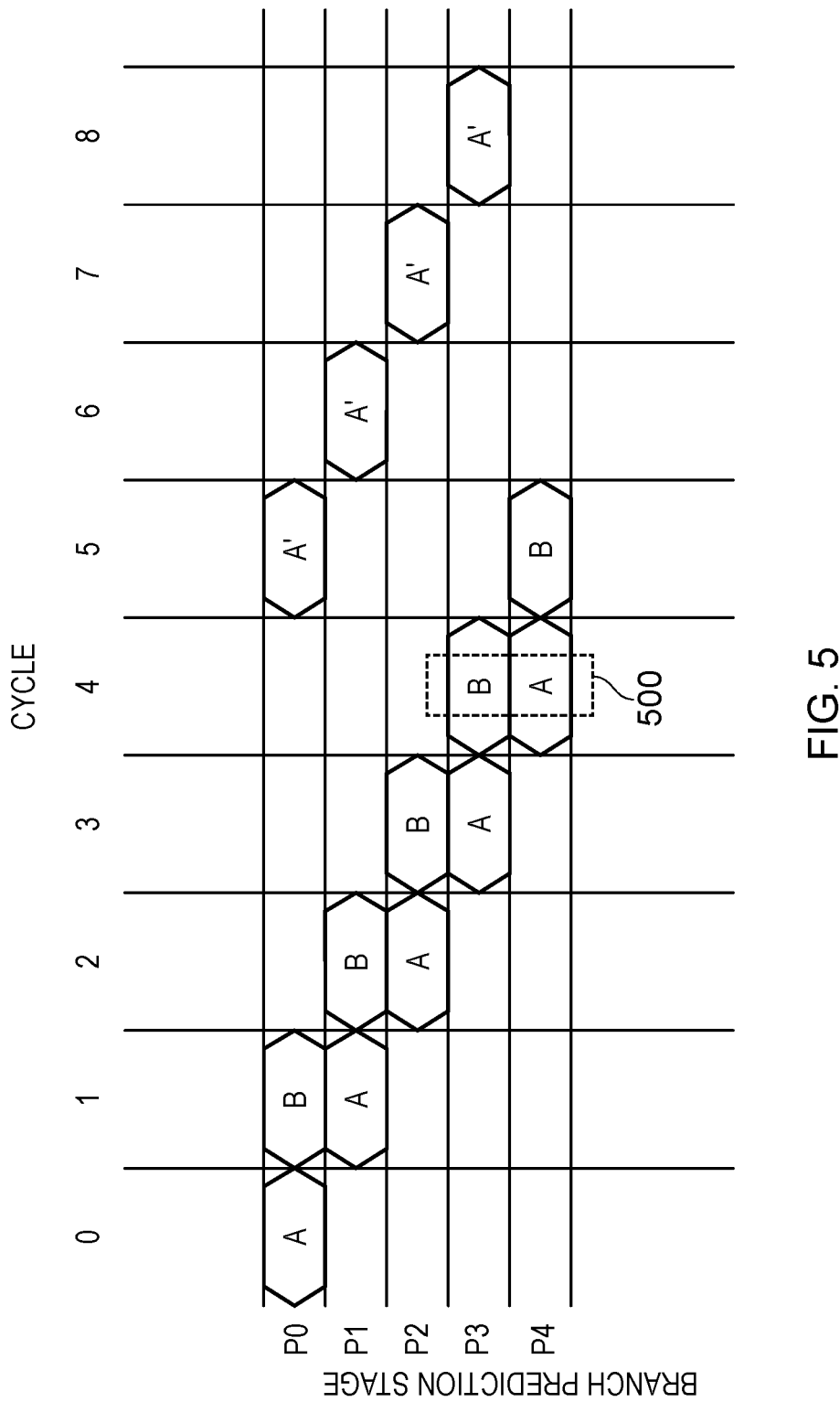
FIG. 5 illustrates the progress of three blocks of instructions through a pipelined branch prediction configuration in one example embodiment.

FIG. 5 schematically illustrates how blocks of instructions may progress through a set of pipelined branch prediction stages labelled P0-P4 at each cycle. Comparing to FIG. 4, these stages can be considered to correspond to: the start of the branch prediction process (P0), BTB look up initiation (P1), stage 418 (P2), stage 426 (P3), and stage 428 (P4). Accordingly it can be seen that a first block A progresses through the pipelined stages of the branch prediction circuitry first. This is immediately followed at the next cycle by block B. When the prediction unit B reaches the P3 stage and the block A is already at the P4 stage, the branch prediction circuitry can determine the relationship between the last executed prediction (prediction unit A) and the currently executed prediction (prediction unit B). The dashed box 500 shows the pair of blocks for which this relationship is determined and from which information will be pushed into with the micro BTB or the way predictor. When it is determined that block A was terminated by a predicted taken instruction, and therefore an entry is made in the micro BTB, the corresponding way prediction information for block B is attached to the branch target of the corresponding micro BTB entry. Alternatively, if the block A is found to have been terminated by sequential fetch (i.e. either contained no branch instructions or all branch instructions were predicted as not-taken) then the way prediction information is stored in the dedicated way predictor 408. Accordingly, if the block A is encountered again (labelled A' in FIG. 5) the branch prediction circuitry can speculatively read out the way prediction information for both the predicted taken case (from the micro BTB 406) and the predicted not taken case (from the way predictor 408) and then select between them based on the predicted direction.

Figure 6:
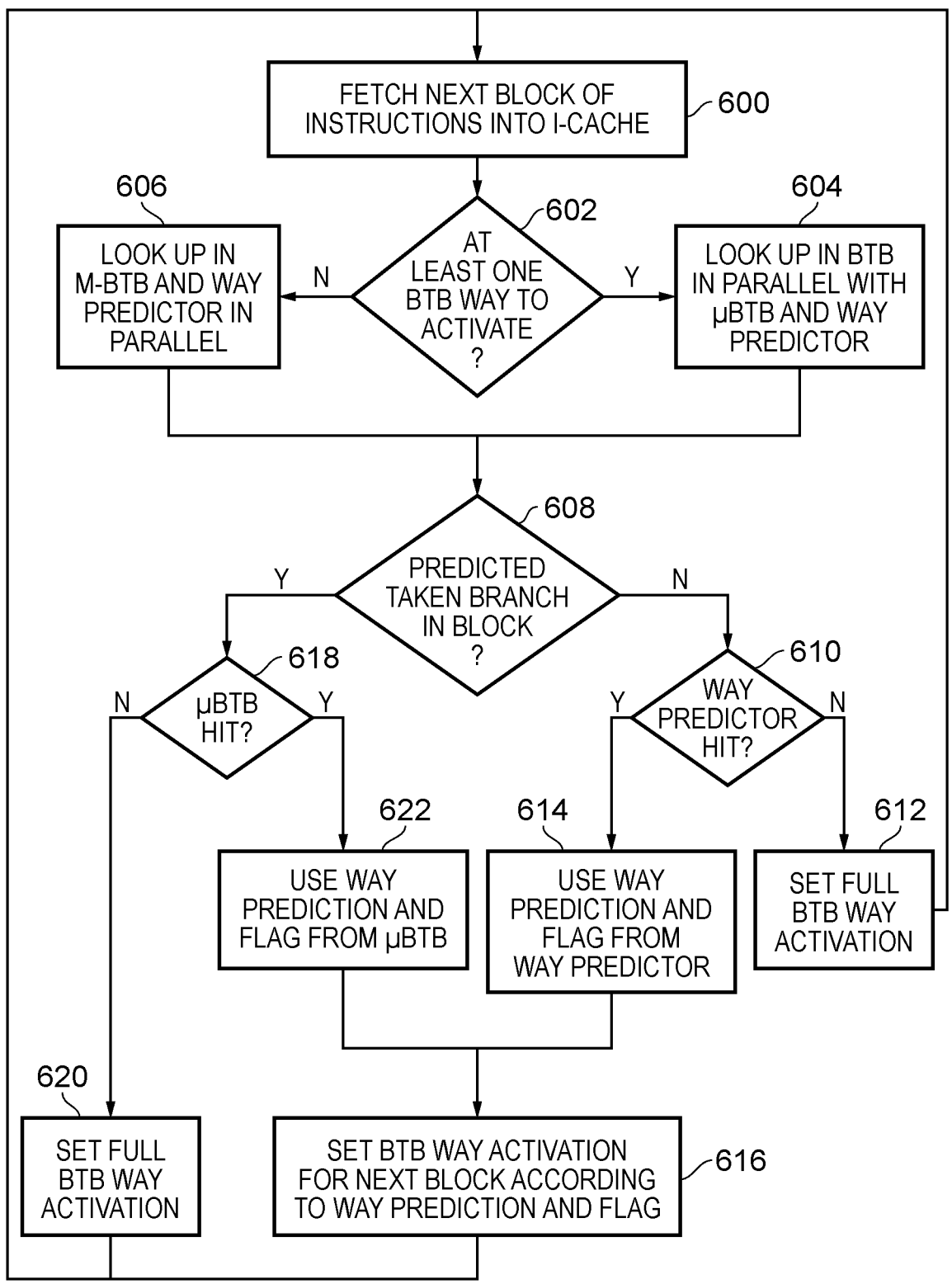
FIG. 6 is a flow diagram showing a sequence of steps which are taken in accordance with one example embodiment.

FIG. 6 is a flow diagram showing a sequence of steps which are taken according to the method of one example embodiment. The flow can be considered to begin at step 600 where a next block of instructions is fetched into an instruction cache. Then at step 602 on the basis of the current way prediction information it is determined at step 602 if there is at least one BTB way to activate. If there is then a look up in parallel between the main BTB and the micro BTB is made, as well as in the way predictor at step 604. Alternatively if there is not, i.e. the current way prediction information indicates that no ways should be activated or the flag accompanying the way information is set indicating that the BTB look up should be suppressed, then at step 606 the look up is performed only in the micro BTB and the way predictor in parallel. It is then determined at step 608 if there is a predicted taken branch in the block under consideration. If there is not, i.e. a sequential fetch is to be made, then the flow proceeds to step 610 where it is determined if the look up in the way predictor resulted in a hit. If it did not then full BTB way activation is set at 612 and the flow returns to step 600. Otherwise, if there is a way predictor hit then the flow proceeds to step 614 where the way prediction and flag information retrieved from the way predictor is used to set up, at step 616, the appropriate BTB way activation for the next block according to the way prediction and flag. Returning to consideration of step 608 if there is a predicted taken branch in the block then the flow proceeds to step 618 where it is determined if there has been a micro BTB hit. If there has not then full BTB way activation is set up at step 620 and the flow returns to step 600. However, if at step 618 it is determined that there was a micro BTB hit then the flow continues to step 622 where the way prediction and flag retrieved from the hit entry in the micro BTB is used and at step 616 this then configures the BTB way activation for the next block according to its content and the flow returns to step 600.

In brief overall summary branch prediction circuitry processes blocks of instructions and provides instruction fetch circuitry with indications of predicted next blocks of instructions to be retrieved from memory. Main branch target storage stores branch target predictions for branch instructions in the blocks of instructions. Secondary branch target storage caches the branch target predictions from the main branch target storage. Look-ups in the secondary branch target storage and the main branch target storage are performed in parallel. The main branch target storage is set-associative and an entry in the main branch target storage comprises multiple ways, wherein each way of the multiple ways stores a branch target prediction for one branch instruction. The branch prediction circuitry stores a way prediction for which of the multiple ways contain the branch target predictions for a predicted next block of instructions and stores a flag associated with the way prediction indicating whether all branch target predictions stored for the predicted next block of instructions in the main branch target storage are also stored in the secondary branch target storage. An active value of the flag suppresses the look-up in the main branch target storage for the predicted next block of instructions.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. An apparatus comprising:
instruction fetch circuitry to fetch a block of instructions from memory;
branch prediction circuitry to process the block of instructions and provide the instruction fetch circuitry with an indication of a predicted next block of instructions to be retrieved from memory, the branch prediction circuitry comprising:
  main branch target storage to store branch target predictions for branch instructions in the block of instructions; and
  secondary branch target storage to cache the branch target predictions from the main branch target storage, wherein the branch prediction circuitry is configured to initiate a look-up in the secondary branch target storage in parallel with a look-up in the main branch target storage,
wherein the main branch target storage is set-associative and an entry in the main branch target storage corresponding to the block of instructions comprises multiple ways, wherein each way of the multiple ways is configured to store a branch target prediction for one branch instruction in the block of instructions; and
wherein the branch prediction circuitry is arranged to store a way prediction for which of the multiple ways contain the branch target predictions for the predicted next block of instructions and to store a flag associated with the way prediction indicating whether all branch target predictions stored for the predicted next block of instructions in the main branch target storage are also stored in the secondary branch target storage,
and wherein the branch prediction circuitry is responsive to an active value of the flag to suppress the look-up in the main branch target storage for the predicted next block of instructions,
wherein the branch prediction circuitry comprises branch outcome prediction circuitry to generate a prediction of whether each of the branch instructions in the block of instructions will be taken or not-taken, and wherein the predicted next block of instructions to be processed:
  begins at the branch target prediction for a first branch instruction in the block of instructions predicted to be taken by the branch outcome prediction circuitry; and
  begins at a next sequential instruction after the block of instructions, when the branch target prediction does not predict any taken branch instructions in the block of instructions;
the apparatus further comprising way prediction storage and the branch prediction circuitry is arranged to store the way prediction and the flag in an entry of the way prediction storage associated with the block of instructions when the predicted next block of instructions sequentially follows the block of instructions,
wherein the branch prediction circuitry comprises multiple pipelined stages and the branch prediction circuitry is arranged to read out entries in parallel from the secondary branch target storage and the way prediction storage at a first stage of the multiple pipelined stages, and the branch prediction circuitry is responsive to the prediction generated by the branch outcome prediction circuitry to select between the entries read out in parallel from the secondary branch target storage and the way prediction storage.

2. The apparatus as claimed in claim 1, comprising way prediction storage and the branch prediction circuitry is arranged to store the way prediction and the flag in an entry of the way prediction storage associated with the block of instructions when the predicted next block of instructions sequentially follows the block of instructions.

3. The apparatus as claimed in claim 1, wherein the branch prediction circuitry is arranged to store the way prediction and the flag in association with a branch target prediction cached in the secondary branch target storage when the predicted next block of instructions begins with a target instruction of the branch target prediction and a source branch instruction of the branch target prediction in the block of instructions is predicted to be taken.

4. The apparatus as claimed in claim 1, wherein the branch prediction circuitry is arranged to determine a flag setting condition to be true when the main branch target storage has at most one branch target prediction for one branch instruction in the block of instructions and the at most one branch target prediction is cached in the secondary branch target storage, and the branch prediction circuitry is responsive to the flag setting condition being true to set the active value of the flag associated with the way prediction.

5. The apparatus as claimed in claim 1, wherein a storage capacity of the secondary branch target storage is less than a storage capacity of the main branch target storage.

6. The apparatus as claimed in claim 5, wherein each entry in the secondary branch target storage comprises a single branch target prediction for the block of instructions.

7. The apparatus as claimed in claim 1, wherein the branch prediction circuitry is responsive to the way prediction indicating that none of the multiple ways contains branch target predictions for the predicted next block of instructions to suppress the look-up in the main branch target storage for the predicted next block of instructions.

8. The apparatus as claimed in claim 1, wherein the branch prediction circuitry is responsive to the way prediction to suppress activation of ways indicated by the way prediction as not containing branch target predictions for the predicted next block of instructions when the predicted next block of instructions is processed by the branch prediction circuitry.

9. The apparatus as claimed in claim 1, wherein the branch prediction circuitry comprises multiple pipelined stages, wherein the multiple pipelined stages comprise at least two pipelined stages following the branch outcome prediction circuitry, wherein the at least two pipelined stages comprises a first stage following the branch outcome prediction circuitry and a second stage following the first stage, and wherein each pipelined stage holds information relating to a single block of instructions.

10. The apparatus as claimed in claim 9, wherein the branch prediction circuitry comprises update circuitry responsive to an indication that an earlier block of instructions in the second stage is terminated by the first branch instruction in the block of instructions predicted to be taken by the branch outcome prediction circuitry
and that the secondary branch target storage comprises an entry for the first branch instruction in the block of instructions predicted to be taken, to cause the entry to be updated to comprise the way prediction and the flag for a later block of instructions in the first stage.

11. The apparatus as claimed in claim 10, wherein the update circuitry is responsive to an indication that the earlier block of instructions in the second stage comprises at most a single branch target prediction for a single branch instruction in the earlier block of instructions and the single branch target prediction is cached in the secondary branch target storage, to set the active value of the flag in the way prediction entry for the earlier block of instructions in the way prediction storage.

12. The apparatus as claimed in claim 9, comprising way prediction storage and the branch prediction circuitry is arranged to store the way prediction and the flag in an entry of the way prediction storage associated with the block of instructions when the predicted next block of instructions sequentially follows the block of instructions,
wherein the branch prediction circuitry comprises update circuitry responsive to an indication that an earlier block of instructions in the second stage comprises no predicted taken branch instructions to cause the entry for the earlier block of instructions in the second stage to be created in the way prediction storage to store the way prediction and the flag for the earlier block of instructions.

13. The apparatus as claimed in claim 9, wherein the branch prediction circuitry comprises update circuitry responsive to replacement of an entry in the secondary branch target storage for a later block of instructions in the first stage to invalidate a way prediction corresponding to an earlier block of instructions in the second stage.

14. The apparatus as claimed in claim 13, wherein the update circuitry is responsive to the replacement of the entry in the secondary branch target storage for the later block of instructions in the first stage to invalidate all flags in the secondary branch target storage.

15. The apparatus as claimed in claim 14, comprising way prediction storage and the branch prediction circuitry is arranged to store the way prediction and the flag in an entry of the way prediction storage associated with the block of instructions when the predicted next block of instructions sequentially follows the block of instructions,
wherein the update circuitry is responsive to the replacement of the entry in the secondary branch target storage for the later block of instructions in the first stage to invalidate all flags in the way prediction storage.

16. The apparatus as claimed in claim 9, wherein the branch prediction circuitry comprises update circuitry responsive to storage of a new branch target prediction in the main branch target storage for the block of instructions to invalidate the way prediction corresponding to a source address for the new branch target prediction.

17. A method of operating a data processing apparatus, the method comprising the steps of:
fetching a block of instructions from memory;
performing branch prediction, comprising processing the block of instructions and providing an indication of a predicted next block of instructions to be fetched from memory, the performing branch prediction comprising the steps of:
storing in main branch target storage branch target predictions for branch instructions in the block of instructions;
caching in secondary branch target storage branch target predictions from the main branch target storage;
initiating a look-up in the secondary branch target storage in parallel with a look-up in the main branch target storage,
wherein the main branch target storage is set-associative and an entry in the main branch target storage corresponding to the block of instructions comprises multiple ways, wherein each way of the multiple ways is configured to store a branch target prediction for one branch instruction in the block of instructions;
storing a way prediction indicating which of the multiple ways contain branch target predictions for the predicted next block of instructions;
storing a flag associated with the way prediction indicating whether all branch target predictions stored for the predicted next block of instructions in the main branch target storage are also stored in the secondary branch target storage; and suppressing the look-up in the main branch target storage for the predicted next block of instructions in response to an active value of the flag, generating a prediction of whether each of the branch instructions in the block of instructions will be taken or not-taken, and wherein the predicted next block of instructions to be processed:

begins at the branch target prediction for a first branch instruction in the block of instructions predicted to be taken by the branch outcome prediction circuitry; and begins at a next sequential instruction after the block of instructions, when the branch target prediction does not predict any taken branch instructions in the block of instructions;

storing the way prediction and the flag in an entry of way prediction storage associated with the block of instructions when the predicted next block of instructions sequentially follows the block of instructions, reading out entries in parallel from the secondary branch target storage and the way prediction storage at a first stage of multiple pipelined stages, and responsive to the generated prediction, selecting between the entries read out in parallel from the secondary branch target storage and the way prediction storage.

18. An apparatus comprising:

instruction fetch circuitry to fetch a block of instructions from memory;

branch prediction circuitry to process the block of instructions and provide the instruction fetch circuitry with an indication of a predicted next block of instructions to be retrieved from memory, the branch prediction circuitry comprising:

main branch target storage to store branch target predictions for branch instructions in the block of instructions; and secondary branch target storage to cache the branch target predictions from the main branch target storage, wherein the branch prediction circuitry is configured to initiate a look-up in the secondary branch target storage in parallel with a look-up in the main branch target storage, wherein the main branch target storage is set-associative and an entry in the main branch target storage corresponding to the block of instructions comprises multiple ways, wherein each way of the multiple ways is configured to store a branch target prediction for one branch instruction in the block of instructions; and wherein the branch prediction circuitry is arranged to store a way prediction for which of the multiple ways contain the branch target predictions for the predicted next block of instructions and to store a flag associated with the way prediction indicating whether all branch target predictions stored for the predicted next block of instructions in the main branch target storage are also stored in the secondary branch target storage, and wherein the branch prediction circuitry is responsive to an active value of the flag to suppress the look-up in the main branch target storage for the predicted next block of instructions, wherein the branch prediction circuitry comprises branch outcome prediction circuitry to generate a prediction of whether each of the branch instructions in the block of instructions will be taken or not-taken, and wherein the predicted next block of instructions to be processed:

begins at the branch target prediction for a first branch instruction in the block of instructions predicted to be taken by the branch outcome prediction circuitry; and begins at a next sequential instruction after the block of instructions, when the branch target prediction does not predict any taken branch instructions in the block of instructions, wherein the branch prediction circuitry comprises multiple pipelined stages, wherein the multiple pipelined stages comprise at least two pipelined stages following the branch outcome prediction circuitry, wherein the at least two pipelined stages comprises a first stage following the branch outcome prediction circuitry and a second stage following the first stage, and wherein each pipelined stage holds information relating to a single block of instructions, wherein the branch prediction circuitry comprises update circuitry responsive to replacement of an entry in the secondary branch target storage for a later block of instructions in the first stage to invalidate a way prediction corresponding to an earlier block of instructions in the second stage.

* * * * *